(12) United States Patent
Hayek et al.

(10) Patent No.: US 7,328,236 B2
(45) Date of Patent: Feb. 5, 2008

(54) METHOD AND SYSTEM FOR ACCESSING INFORMATION AND/OR DATA AVAILABLE ON A WIDE AREA COMPUTER NETWORK

(75) Inventors: Georges Nicolas Hayek, Zürich (CH); Emmanuel Fleury, Moutier (CH); Fabien Blondeau, Le Landeron (CH)

(73) Assignee: Swatch AG, Biel (CH)

( * ) Notice: Subject to any disclaimer, the term of this patent is extended or adjusted under 35 U.S.C. 154(b) by 843 days.

(21) Appl. No.: 10/112,033

(22) Filed: Apr. 1, 2002

(65) Prior Publication Data

US 2002/0152314 A1    Oct. 17, 2002

(30) Foreign Application Priority Data

Apr. 6, 2001    (EP) .................................. 01201271

(51) Int. Cl.
  G06F 15/16    (2006.01)
  G06F 7/00    (2006.01)
  G06F 17/30    (2006.01)
(52) U.S. Cl. ........................................ 709/202; 707/10
(58) Field of Classification Search ................ 709/201, 709/203, 228, 245, 248, 202; 707/10
See application file for complete search history.

(56) References Cited

U.S. PATENT DOCUMENTS 3,553,374 A * 1/1971 Wolf et al. .................. 379/443
3,597,546 A * 8/1971 Zehr ....................... 379/93.37
4,242,745 A * 12/1980 Mutrux ......................... 368/73
5,325,127 A * 6/1994 Dinsel ......................... 348/473
5,379,345 A * 1/1995 Greenberg ................. 455/2.01
5,404,377 A * 4/1995 Moses ......................... 375/145
5,457,807 A * 10/1995 Weinblatt ................... 455/2.01
5,581,576 A * 12/1996 Lanzetta et al. ............ 375/216
5,719,825 A * 2/1998 Dotter ......................... 368/10
5,732,216 A    3/1998 Logan et al.
5,774,452 A * 6/1998 Wolosewicz ................ 370/212
5,781,177 A * 7/1998 Helot et al. ................. 345/156
5,787,334 A * 7/1998 Fardeau et al. ............... 725/22
5,804,803 A    9/1998 Cragun et al.
5,822,360 A * 10/1998 Lee et al. .................... 375/140

(Continued)

FOREIGN PATENT DOCUMENTS

EP    896460 A2    2/1999

(Continued)

*Primary Examiner*—George C. Neurauter, Jr.
(74) *Attorney, Agent, or Firm*—Sughrue Mion, Pllc.

(57) ABSTRACT

There is disclosed a method and a system for accessing information and/or data available on a wide area computer network (100), such as the Internet. A first modulated acoustic signal (A) is transmitted to a group of potential users each provided with a portable communication unit (1, 1*), this first modulated acoustic signal including at least one identifier (ID_1, ID_2, ID_3, ... ) associated with a link to a determined site of the wide area computer network. These identifiers are stored in the portable communication unit then subsequently downloaded to a computer terminal (50, 51, 52) connected to the wide area computer network. After the downloaded identifier or identifiers have been compared with a determined list of identifiers (ID_A, ID_B, ID_C, ... ), a list of links (Link_A, Link_B, Link_C, ... ) to sites corresponding to the downloaded identifier or identifiers is generated by the computer terminal.

17 Claims, 2 Drawing Sheets

U.S. PATENT DOCUMENTS

| | | | |
|---|---|---|---|
| 5,842,009 A * | 11/1998 | Borovoy et al. | 707/1 |
| 5,933,827 A * | 8/1999 | Cole et al. | 707/10 |
| 5,953,392 A | 9/1999 | Rhie et al. | |
| 5,978,773 A | 11/1999 | Hudetz et al. | |
| 5,978,799 A * | 11/1999 | Hirsch | 707/4 |
| 5,982,520 A * | 11/1999 | Weiser et al. | 398/126 |
| 5,995,599 A * | 11/1999 | Dunn et al. | 379/93.37 |
| 6,034,621 A * | 3/2000 | Kaufman | 340/7.21 |
| 6,055,538 A * | 4/2000 | Kessenich et al. | 707/101 |
| 6,151,578 A * | 11/2000 | Bourcet et al. | 704/500 |
| 6,304,638 B1 * | 10/2001 | Coulter et al. | 379/93.37 |
| 6,512,796 B1 * | 1/2003 | Sherwood | 375/242 |
| 6,577,559 B1 * | 6/2003 | Fleury et al. | 368/250 |
| 6,606,654 B1 * | 8/2003 | Borman et al. | 709/219 |
| 6,625,087 B2 * | 9/2003 | Paratte | 368/69 |
| 6,628,729 B1 * | 9/2003 | Sorensen | 375/316 |
| 6,691,227 B1 * | 2/2004 | Gopal et al. | 713/162 |
| 6,747,916 B1 * | 6/2004 | Fleury et al. | 368/10 |
| 6,934,521 B1 * | 8/2005 | Fleury et al. | 455/171.1 |
| 2002/0095333 A1 * | 7/2002 | Jokinen et al. | 705/14 |

FOREIGN PATENT DOCUMENTS

| | | |
|---|---|---|
| EP | 957 589 A1 | 11/1999 |
| EP | 1 075 098 A9 | 2/2001 |

* cited by examiner

METHOD AND SYSTEM FOR ACCESSING INFORMATION AND/OR DATA AVAILABLE ON A WIDE AREA COMPUTER NETWORK

BACKGROUND OF THE INVENTION

The present invention relates to a method and a system for accessing information and/or data available on a wide area computer network, like the Internet.

Wide area computer networks, or global networks, like the Internet, are now used across the world by millions of individuals to convey all types of information and data, such as textual data, images or any other media capable of being translated into digital form. These networks have developed at a lightening pace over the last ten years and the quantity of information now accessible to everyone has become practically unlimited.

Access to sites on these computer networks is governed by determined addresses or links (also called URLs—"Universal Resource Locators") generally allocated by national regulating authorities. A user wishing to be connected to a specific site necessarily has to memorize these links to obtain the relevant information he is seeking, these links being more or less long and complex to memorize. Although the links are generally "translated" and specified in intelligible terms relating typically to the trade name or designation used by the company or person maintaining the sites, there is a recurrent risk of error when such a link is entered, which may result in connection to a different site from that which was originally desired, or, quite simply, in a failure to connect to the desired site.

Moreover, given the typical complexity of the organisation of the sites, the user is generally connected first of all to the main page of the site in question before being able to access the specific site page showing the information he is seeking. This problem is all the more frequent when the pages of such sites are regularly updated and the links to such pages can evolve at the will of maintenance of the sites.

This also constitutes a major problem for companies or individuals wishing to offer services aimed at clients or users as well as quick and direct access to information.

Moreover, there is no real cohesion between this information and data media formed by the global computer networks and the other conventional media such as television or radio for example. Although it is currently possible to verbally or visually indicate a link to a site to a potential user via a TV or radio commercial or any other visual or audio announcement transmitted by similar means, this mode of communication is not currently satisfactory, in particular because of the complexity and breadth of information which has to be memorized by the user as was already mentioned hereinbefore. When this mode of communication is used, typically only the main link of the site on the network will be indicated, and not the site page on which the relevant information itself is shown. It is thus the user himself who peruses the site in question in order to find the desired information.

There therefore exists a real need for a solution enabling both the user to access data and/or information available on these global computer networks easily, quickly and directly, and enabling the site managers to provide direct access to the pages containing such data and/or information.

SUMMARY OF THE INVENTION

One general object of the present invention is thus to propose such a solution facilitating access to data or information available on global computer networks.

Another object of the present invention is to propose a solution which is easy to implement, if possible using existing installations, or at least with as few modifications as possible.

A further object of the present invention is to propose a solution, which assures an interface between conventional media for transmitting information, such as the television or radio, and wide area computer networks, such as the Internet.

The present invention thus concerns a method for accessing information and/or data available on a wide area computer network the features of which are listed in the claims.

The present invention also concerns a system for accessing information and/or data available on a wide area computer network the features of which also are listed in the claims.

Advantageous embodiments of the present invention form the subject of the dependent claims.

According to the invention, identifiers each associated with the link of a site (or a page of the site) and, possibly, with a "key" providing access to privileged data on a site, are transmitted in the form of an acoustic signal modulated via acoustic transmission means. This modulated acoustic signal can be transmitted to a vast panel of users via a broad distribution medium, such as the television or radio, or to a more restricted group of users by means of a specific installation for example arranged in a delimited space, such as a shop, a tourist location, a museum, etc.

Most information transmission equipment, such as the TV or radio, are fitted with loudspeakers for reading out audio signals capable of being heard by users. The use of this pre-existing transmission mode to communicate links to data or information available on wide area computer networks thus does not require any particular adaptation of such equipment so that the invention can be implemented at minimum cost.

It will be noted in this regard that devices allowing the transmission and exchange of data via an acoustic interface are already known, in particular from Patent Applications Nos. EP 1 075 098 and WO 01/10064 in the name of Eta SA Fabriques d'Ebauches which are incorporated herein by reference. This communication mode is for example applied in Patent Application No. WO 01/09689, also in the name of Eta SA Fabriques d'Ebauches, for setting the time of a portable object having a time-related function.

According to the invention, the identifiers are transmitted and stored in a mobile communication unit carried by the user, such as a wristwatch. These identifiers are subsequently downloaded by the user, preferably also using an acoustic interface, onto a computer terminal connected to the wide area computer network on which the searched information or data appears.

Preferably, the computer terminal is connected to a specific site on the wide area computer network including a database containing a list of the identifiers and links associated with the identifiers. A comparison is made between the identifiers loaded by the user and the identifiers present in the database, and the corresponding links are made accessible to the user.

The method and the system according to the invention may in particular be used in order to convey advertising information (special announcements, time limited offers, gift vouchers, etc.) aimed at a group of users or potential clients, or to direct these users directly to a detailed information page relating to a current event (information bulletin, comprehensive sports results, etc.). This method and this system may also be used, in cultural or tourist locations, to transmit to users a specific link to a site relating to the place visited, which the users can subsequently use to obtain further information about the cultural or tourist location visited.

BRIEF DESCRIPTION OF THE DRAWINGS

Other features and advantages of the present invention will appear more clearly upon reading the following detailed description, made with reference to the annexed drawings, given by way of non-limiting example, and in which.

DETAILED DESCRIPTION OF THE INVENTION

According to the invention, each potential user is provided with a portable communication unit 1 advantageously able to take the form of a wristwatch as illustrated. This portable communication unit 1 includes in particular transmitting and receiving means of modulated acoustic signals and is shown in more detail in FIG. 2.

Figure 2:
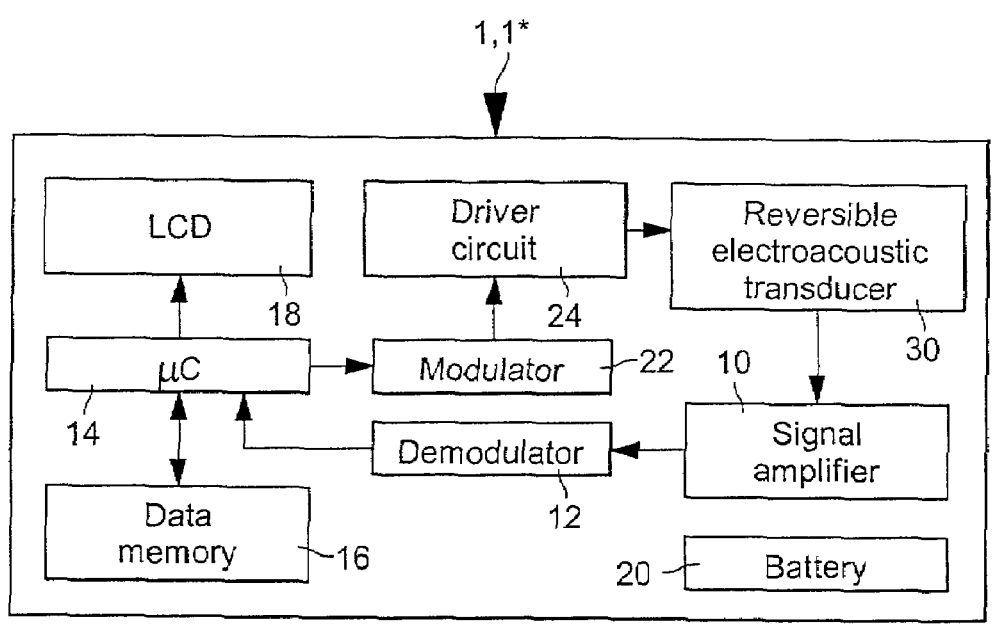
FIG. 2 shows schematically a particular embodiment example of the portable communication unit 1 used in the system according to the invention.

FIG. 2 shows schematically a particular embodiment example of portable communication unit 1, which can take the form of a timepiece. Unit 1 includes receiving means formed by an electro-acoustic transducer 30 which acts as a microphone and which conventionally converts the incident acoustic signal into a succession of electric signals which will then be converted by conversion means of portable unit 1 into data intended to be processed and stored. In the example shown in FIG. 2, the conversion means of portable unit 1 include an amplifier 10 for the electric signal generated by electro-acoustic transducer 30 and a demodulator 12 connected to signal amplifier 10 and intended to demodulate the acoustic signal received by transducer 30 and to transmit the demodulated signal to an input of a micro-controller 14. Micro-controller 14 forms processing means for portable unit 1. The information carried by the received acoustic signal, demodulated by demodulator 12 and processed by micro-controller 14, is stored in a memory 16 of unit 1 and, if necessary, may be displayed on a display device 18 for example a liquid crystal display. A battery 20, which may be rechargeable, powers portable unit 1 with electric current.

Preferably, portable unit 1 is also provided with conversion and transmission means for converting the data stored in memory 16 and provided by processing means 14 into a modulated acoustic signal representative of the stored data, and for transmitting this acoustic signal. As shown in FIG. 2, the conversion means of portable unit 1 include a modulation circuit 22, which drives, via a drive circuit 24, the transmitting means, namely electro-acoustic transducer 30 acting, in this case, as a loudspeaker. The processing means of portable unit 1, i.e. micro-controller 14, controls modulation circuit 22 using data originating from memory 16 associated with micro-controller 14.

Advantageously, the conversion and transmitting means and the receiving and conversion means of portable unit 1 use the same single electro-acoustic transducer 30 which operates in a reversible manner, i.e. both as a microphone and as a loudspeaker. It will be understood nonetheless that two distinct electro-acoustic transducers may also be used.

Portable communication unit 1 is adapted to receive a first modulated acoustic signal, designated A, transmitted by suitable transmitting means. These transmitting means can advantageously be formed of a television 2 connected to the hertzian, cable or satellite televised programme transmission network or, by analogy, of a radio set 3 connected to the radio transmission network. Modulated acoustic signal A is typically transmitted, for example during a commercial or a retransmission programme, as an audio signal (modulated by a digital sequence) by means of loudspeaker(s) 2a, 3a, with which television 2 or radio set 3 is typically provided.

Alternatively, for applications intended to reach a more restricted public, for example in a shop or a tourist or cultural location, modulated acoustic signal A can be transmitted by a specific device 4 essentially including, in a similar manner to television 2 or radio set 3, a loud-speaker 4a. This loudspeaker 4a may be controlled for example by a computerised system 4b arranged to generate modulated acoustic signals A, such as a microcomputer or another computer terminal. It will of course be understood that device 4 can take various forms, the essential being that it includes means for transmitting an acoustic signal (like loud-speaker 4a) and means for generating these acoustic signals.

Modulated acoustic signal A includes, according to the invention, one or more identifiers, designated ID_n (n=1, 2, 3, . . . . These identifiers ID_n are each associated with a link (determined as a function of the application or moment) to a determined site (site 101, 102, 103, etc.) on the wide area computer network, designated 100 in FIG. 1. Modulated acoustic signal A may include one or more of these identifiers.

Identifiers ID_n are for example formed of a binary digital sequence by means of which acoustic signal A is modulated. Those skilled in the art have available a very varied number of solutions for modulating the acoustic signal by means of a binary digital sequence, such as amplitude modulation, frequency modulation (for example in accordance with a technique called Frequency-Shift Keying, or FSK, wherein the signal frequency is switched between two determined frequencies) or phase modulation (for example in accordance with a technique called Phase-Shift Keying, or PSK, wherein the signal is alternately phase shifted by 180° depending upon whether one wishes to transmit a "0" or a "1". Detailed information concerning these known modulation techniques can be found in the work "Electronic Engineers' Handbook", D. Christiansen, $4^{th}$ edition, McGraw-Hill, 1997, chapter 18, pp. 18.40 to 18.44.

Figure 1:
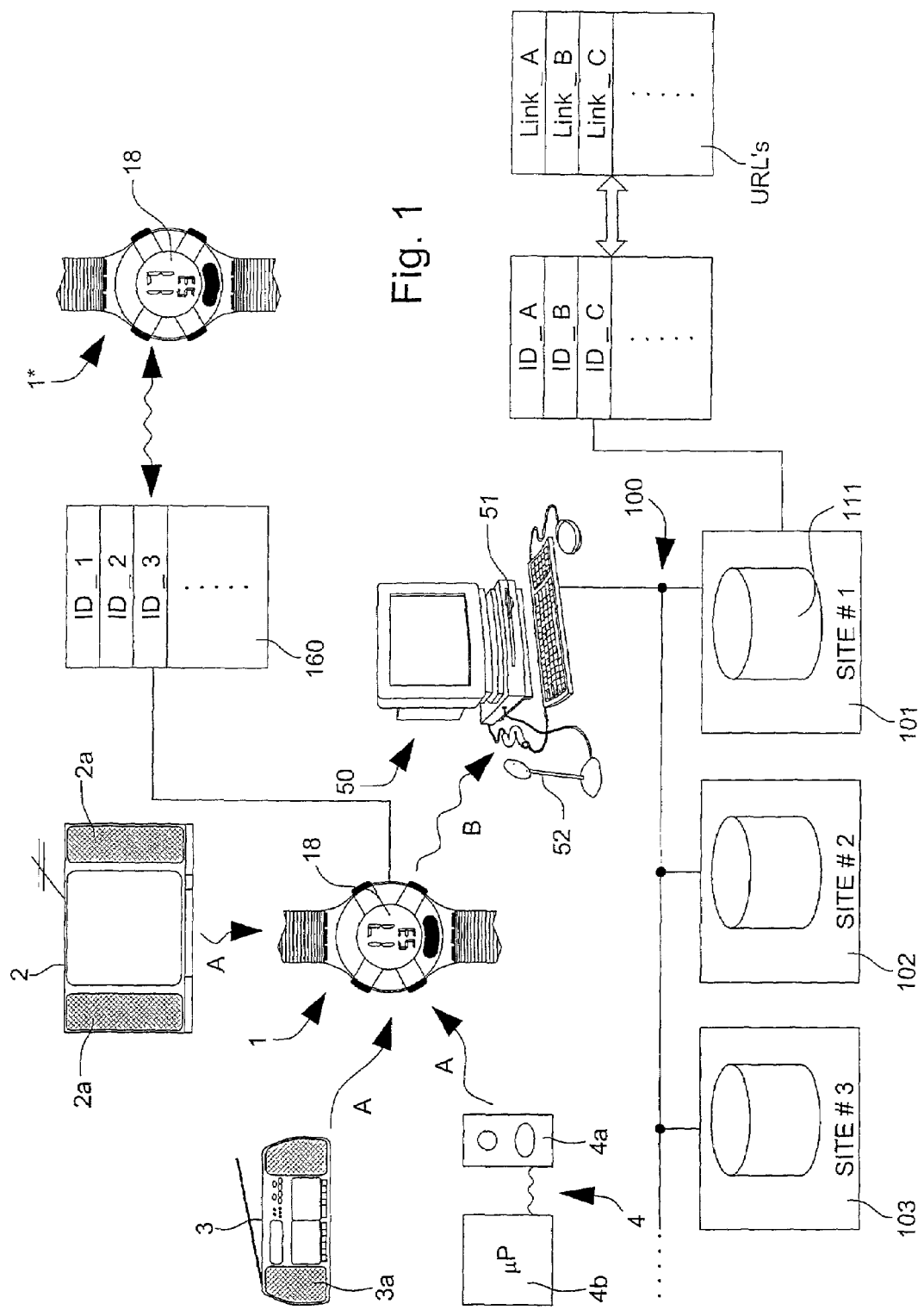
FIG. 1 shows schematically a system for accessing data and/or information available on a wide area computer network according to the present invention.

Identifiers ID_n transmitted by means of modulated acoustic signal A are stored in the data memory (16 in FIG. 2) of each communication unit 1 as is schematised by the memory fields designated 160 in FIG. 1.

According to a variant of the invention, one or more of these identifiers ID_n can be exchanged with a similar communication unit, designated 1*, with which another user is provided. By selecting one identifier among the set of stored identifiers (for example identifier ID_3 as illustrated), a user can thus easily transmit a pre-stored link to another system user. This exchange is preferably and advantageously effected by means of the acoustic interface of each communication unit 1, 1*.

The identifiers ID_n stored in communication unit 1, are then downloaded onto a computer terminal, designated 50, including in particular a central processing unit 51 connected to wide area computer network 100. This computer terminal 50 is preferably provided with means enabling it to receive an external acoustic signal, for example, a microphone 52. The identifiers ID_n stored in portable communication unit 1 are thus downloaded by means of the acoustic interface between computer terminal 50 and unit 1 by transmitting a modulated acoustic signal, designated B, and at least temporarily stored in the memory of central processing unit 51.

Alternatively, it will be understood that the identifiers can be downloaded by different means to acoustic means, such as optical or radio-frequency means, or via a cable connection. It will be understood nonetheless that the use of an acoustic interface constitutes a determining advantage since practically all modern computer terminals are fitted with means for receiving acoustic signals or at least can be fitted with such means at a low cost, whereas the use of other transmission means requires specific non standard equipment or involves a complicated construction for portable communication unit 1.

By way of a particularly advantageous embodiment, one could use the communication unit 1 illustrated in FIG. 2 and using an electronic acoustic signal converter and an acoustic wave communication method as disclosed in aforementioned European Patent Application No. 1 075 098. In accordance with this Application, one may in particular advantageously use a sound generator circuit using a piezoelectric vibrator.

Once identifiers ID_n have been downloaded onto computer terminal 50, they are compared to a determined list of identifiers ID_A, ID_B, ID_C, etc., each corresponding to a determined link Link_A, Link_B, Link_C, etc., to a site or a determined page of a site on wide area computer network 100. A list of links corresponding to the downloaded identifiers is then generated by computer terminal 50 and made accessible to the user for connection thereto. This connection may advantageously be made automatic as soon as the comparison of the identifiers has been made.

Preferably, computer terminal 50 is connected to a specific site on wide area computer network 100 (solely by way of example the site www.swatch.com), this specific site, designated 101 in FIG. 1, including a data base 111 containing the determined list of identifiers ID_A, ID_B, ID_C, etc., and associated links Link_A, Link_B, Link_C, . . . etc. Comparison of this list with the downloaded identifiers can then be effected by specific site 101, so that only a small plug-in has to be installed in computer terminal 50, which thus does not require the determined list of links and associated identifiers to be loaded on computer terminal 50.

In addition to the links to sites or specific site pages on wide area computer network 100, the identifiers may also be associated with a key providing access to privileged data on the site with which said identifier is associated. For example, in view of a client fidelity programme, the system could also be used to accumulate fidelity points in an account hosted in a site of wide area computer network 100.

Moreover, an identifier could also automatically start a predefined process on the computer terminal. For example, when the user downloads an identifier of this type on his computer terminal, the identifier could also automatically start an application such as the plug-in allowing him to be connected to determined site 101 including database 111. This identifier could also modify certain parameters of the computer terminal such as the graphic representation of his screen, generation of a melody, etc.

It will be understood that various modifications and/or improvements that are obvious to those skilled in the art may be made to the embodiment described in the present description without departing from the scope of the invention defined by the annexed claims. In particular, it will be understood that the term "link" encompasses any address or reference enabling a user to be connected to a particular site on the network or to a specific page of the site.

What is claimed is:

1. A method for accessing information and/or data available on a wide area computer network, such as the Internet, using information transmission equipment fitted with loudspeakers for reading out audio signals capable of being heard by users, said method including:
   a) transmitting, via the loudspeakers of the information transmission equipment, a first modulated acoustic signal to a group of potential users each provided with a portable communication unit, this first modulated acoustic signal including at least one identifier associated with a link to a determined site of said wide area computer network;
   b) storing, in said portable communication unit, the identifier or identifiers transmitted by means of said first modulated acoustic signal;
   c) downloading the identifier or identifiers stored in said portable communication unit in a computer terminal connected to said wide area computer network; and
   d) comparing the downloaded identifier or identifiers with a determined list of identifiers in order to generate a list of links to sites corresponding to the downloaded identifier or identifiers,
   wherein at least one identifier is retransmitted from a portable communication unit of one user to the portable communication unit of another user.

2. A system for accessing information and/or data available on the Internet, using information transmission equipment fitted with loudspeakers for reading out audio signals capable of being heard by users, said system including:
   means for transmitting, via the loudspeakers of the information transmission equipment, a first modulated acoustic signal to a group of potential users, this first modulated acoustic signal including at least one identifier associated with a link to a determined site of said Internet;
   a portable communication unit, with which each user is provided, this portable communication unit including means for receiving said first modulated acoustic signal, means for storing the identifier or identifiers transmitted by means of said first modulated acoustic signal, and means for transmitting a second modulated acoustic signal including the identifier or identifiers stored by said portable communication unit, at least one identifier being retransmitted from a potable communication unit of one user to the portable communication unit of another user; and
   a computer terminal connected to said Internet and including downloading means adapted to receive said second modulated acoustic signal, this computer terminal being arranged to compare the downloaded identifier or identifiers with a determined list of identifiers and to generate a list of links to sites corresponding to the downloaded identifier or identifiers.

3. A system according to claim 2, wherein said computer terminal is connected to a specific site of the Internet including a data base containing said determined list of identifiers and in that the comparison of the downloaded identifier or identifiers with the determined list of identifiers is effected by said specific site.

4. A system according to claim 2, wherein at least one identifier is also associated with a key providing access to privileged data of the site with which said identifier is associated.

5. A system according to claim 2, wherein said first modulated acoustic signal is transmitted by means of a TV or radio retransmission installation.

6. A method according to claim 1, wherein said downloading step c) is achieved by transmitting, to said computer terminal, a second modulated acoustic signal including the identifier or identifiers stored by said portable communication unit.

7. A method according to claim 1, wherein said computer terminal is connected to a specific site of the Internet including a database containing said determined list of identifiers and in that said comparing step d) is effected by said specific site.

8. A method according to claim 6, wherein said computer terminal is connected to a specific site of the Internet including a database containing said determined list of identifiers and in that said comparing step d) is effected by said specific site.

9. A method according to claim 8, wherein at least one identifier is also associated with a key providing access to privileged data on the site with which said identifier is associated.

10. A method according to claim 1, wherein at least one identifier is also associated with a key providing access to privileged data on the site with which said identifier is associated.

11. A method according to claim 1, wherein at least one identifier automatically staffs a predefined process in said computer terminal, such as connection to a determined site of said Internet, as soon as the identifier is downloaded onto the computer terminal.

12. A method according to claim 6, wherein at least one identifier automatically staffs a predefined process in said computer terminal, such as connection to a determined site of said Internet, as soon as the identifier is downloaded onto the computer terminal.

13. A method according to claim 7, wherein at least one identifier automatically staffs a predefined process in said computer terminal, such as connection to a determined site of said Internet, as soon as the identifier is downloaded onto the computer terminal.

14. A method according to claim 8, wherein at least one identifier automatically staffs a predefined process in said computer terminal, such as connection to a determined site of said Internet, as soon as the identifier is downloaded onto the computer terminal.

15. A method according to claim 9, wherein at least one identifier automatically staffs a predefined process in said computer terminal, such as connection to a determined site of said Internet, as soon as the identifier is downloaded onto the computer terminal.

16. A method according to claim 10, wherein at least one identifier automatically staffs a predefined process in said computer terminal, such as connection to a determined site of said Internet, as soon as the identifier is downloaded onto the computer terminal.

17. A method according to claim 1, wherein said first modulated acoustic signal is transmitted by means of a TV or radio retransmission installation.

* * * * *